United States Patent
Cho et al.

(10) Patent No.: US 8,665,387 B2
(45) Date of Patent: Mar. 4, 2014

(54) LIQUID CRYSTAL DISPLAY

(75) Inventors: Seon-Ah Cho, Busan (KR); Hee-Wook Do, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 346 days.

(21) Appl. No.: 12/903,417

(22) Filed: Oct. 13, 2010

(65) Prior Publication Data

US 2011/0128460 A1 Jun. 2, 2011

(30) Foreign Application Priority Data

Dec. 1, 2009 (KR) .......................... 10-2009-0117739

(51) Int. Cl.
*G02F 1/136* (2006.01)

(52) U.S. Cl.
USPC ................... 349/48; 349/41; 349/39; 349/42; 349/43; 349/44; 345/174

(58) Field of Classification Search
USPC ............................ 349/39, 41–45, 48; 345/174
See application file for complete search history.

(56) References Cited

U.S. PATENT DOCUMENTS

| | | | |
|---|---|---|---|
| 5,610,739 A | 3/1997 | Uno et al. | |
| 2005/0104814 A1* | 5/2005 | Choi et al. | 345/76 |
| 2008/0074567 A1* | 3/2008 | Jeon et al. | 349/33 |
| 2008/0129706 A1* | 6/2008 | Kim et al. | 345/174 |
| 2008/0246038 A1* | 10/2008 | Um et al. | 257/72 |
| 2008/0284929 A1* | 11/2008 | Kimura | 349/38 |
| 2009/0135323 A1* | 5/2009 | Yang et al. | 349/37 |
| 2009/0195719 A1* | 8/2009 | Kim et al. | 349/39 |
| 2010/0225842 A1* | 9/2010 | Hur et al. | 349/48 |

FOREIGN PATENT DOCUMENTS

| | | |
|---|---|---|
| JP | 2007293158 | 11/2007 |
| JP | 4104639 | 6/2008 |
| KR | 1020040056970 | 7/2004 |
| KR | 1020040105934 | 12/2004 |
| KR | 1020050018520 | 2/2005 |
| KR | 1020080064055 | 7/2008 |
| KR | 1020080101582 | 11/2008 |
| KR | 1020080102798 | 11/2008 |

* cited by examiner

*Primary Examiner* — Edward Glick
*Assistant Examiner* — Sang V Nguyen
(74) *Attorney, Agent, or Firm* — Cantor Colburn LLP

(57) ABSTRACT

A liquid crystal display includes: first and second substrates; a liquid crystal layer; first and second gate lines; a data line and a voltage supplying line disposed on the first substrate; and a pixel. The pixel includes a first switching element connected to the first gate line and the data line, a second switching element connected to the first gate line and the voltage supplying line, a third switching element connected to the second gate line, a first pixel electrode connected to the first switching element, and a separate second pixel electrode connected to the second switching element. The voltage supplying line is supplied with a first voltage, which has a substantially uniform magnitude.

44 Claims, 15 Drawing Sheets

LIQUID CRYSTAL DISPLAY

This application claims priority to Korean Patent Application No. 10-2009-0117739, filed on Dec. 1, 2009, and all the benefits accruing therefrom under 35 U.S.C. §119, the content of which in its entirety is herein incorporated by reference.

BACKGROUND OF THE INVENTION (1) Field of the Invention

The present invention relates to a liquid crystal display.

(2) Description of the Related Art

A liquid crystal display ("LCD") is a widely used type of flat panel display. The LCD typically includes two display panels, which are provided with electric field generating electrodes, and a liquid crystal layer interposed between the two display panels. In the LCD, voltages are applied to the electric field generating electrodes to generate an electric field in the liquid crystal layer. Due to the generated electric field, liquid crystal molecules in liquid crystal layer are aligned, and polarization of light incident to the liquid crystal layer is controlled to display a desired image.

The LCDs also typically include switching elements connected to pixel electrodes, and signal lines, such as gate lines and data lines, that control the switching elements to apply data voltages to the pixel electrodes.

The LCD receives an input image signal from an external graphics controller, the input image signal contains luminance information for each of the pixels, and the luminance has grays from a given number of grays. Each pixel is supplied with the data voltage, which corresponds to desired luminance information to display the image. The data voltage applied to the pixel is a pixel voltage, and each pixel thereby displays a luminance representing a gray of the image signal according to the pixel voltage. Thus, a range of the pixel voltage applicable to the particular liquid crystal display is determined according to a driver included in the LCD.

The driver of the LCD is typically mounted on one of the display panels, in a form of integrated circuit ("IC") chips, or may be installed on a flexible circuit film and attached to the display panel. Generally, the cost of the driver is a significant portion of the manufacturing cost of the LCD. In addition, the cost of the driver of the liquid crystal display increases as the number of data lines for supplying the data voltage to the pixels increases.

Also, to improve the display quality of LCDs, contrast ratio, viewing angle and response speed need to be improved.

BRIEF SUMMARY OF THE INVENTION

The present invention provides a liquid crystal display ("LCD") that has a high contrast ratio and a wide viewing angle, while also having reduces cost of a driver thereof, by decreasing a required number of data lines in the LCD.

A liquid crystal display according to an exemplary embodiment of the present invention includes: a first substrate and a second substrate facing, e.g., disposed opposite to, the first substrate; a liquid crystal layer interposed between the first and second substrates and including liquid crystal molecules; a first gate line and a second gate line disposed on the first substrate; a data line disposed on the first substrate; a voltage supplying line disposed on the first substrate; and a pixel. The pixel includes a first switching element connected to the first gate line and the first data line a second switching element connected to the first gate line and the voltage supplying line a third switching element connected to the second gate line a first pixel electrode connected to the first switching element and a second pixel electrode connected to the second switching element. The voltage supplying line is supplied with a first voltage having a substantially uniform magnitude.

A first sharing capacitor including the first pixel electrode and an output terminal of the second switching element as terminals thereof, and a second sharing capacitor including the second pixel electrode and an output terminal of the first switching element as terminals thereof may be further included.

An input terminal of the third switching element may be connected to the output electrode of the first switching element, and an output terminal of the third switching element may be connected to the output terminal of the second switching element.

When the first gate line is supplied with a gate-on signal, the first pixel electrode is supplied with a first data voltage through the data line, the second pixel electrode is supplied with the first voltage through the voltage supplying line, and an absolute value of the first data voltage may be greater than an absolute value of the first voltage.

When the first gate line is supplied with the gate-on signal, the first sharing capacitor is charged with a first charge by the first voltage, the second sharing capacitor is charged with a second charge by the data voltage, and an amount of the second charge may be greater than an amount of the first charge.

When the second gate line is supplied with the gate-on signal, the second charge charged to the second sharing capacitor may be transferred to the first sharing capacitor by the third switching element.

When the second gate line is supplied with the gate-on signal, the first pixel electrode and the second pixel electrode may be electrically floated.

The second charge charged to the second sharing capacitor is transferred to the first sharing capacitor by the third switching element such that a voltage of the first pixel electrode increases and a voltage of the second pixel electrode decreases.

The voltage of the first pixel electrode may be greater than the first voltage, and the voltage of the second pixel electrode may be less than the first voltage.

A common electrode may be disposed on the second substrate.

The liquid crystal molecules may be arranged substantially parallel to surfaces of the first substrate and the second substrate when an electric field is not applied to the liquid crystal layer.

The liquid crystal molecules may have negative dielectric anisotropy.

In another exemplary embodiment, the liquid crystal molecules have positive dielectric anisotropy.

The first pixel electrode and the second pixel electrode may include branch electrodes, and the branch electrodes of the first pixel electrode and the branch electrodes of the second pixel electrode may be alternately disposed on the first substrate.

The liquid crystal molecules may be arranged substantially parallel to surfaces of the first substrate and the second substrate when an electric field is not applied to the liquid crystal layer.

In another exemplary embodiment, the liquid crystal molecules may be arranged substantially perpendicular to surfaces of the first substrate and the second substrate when an electric field is not applied to the liquid crystal layer.

Thus, according to exemplary embodiments of the present invention as described herein, the display quality of a liquid crystal display is substantially increased, and a required number of data lines is significantly reduced, such that the driver cost of the liquid crystal display is substantially reduced.

BRIEF DESCRIPTION OF THE DRAWINGS

The above and other aspects and features of the present invention will become more readily apparent by describing in further detail exemplary embodiments thereof with reference to the accompanying drawings, in which.

DETAILED DESCRIPTION OF THE INVENTION

Figure 1:
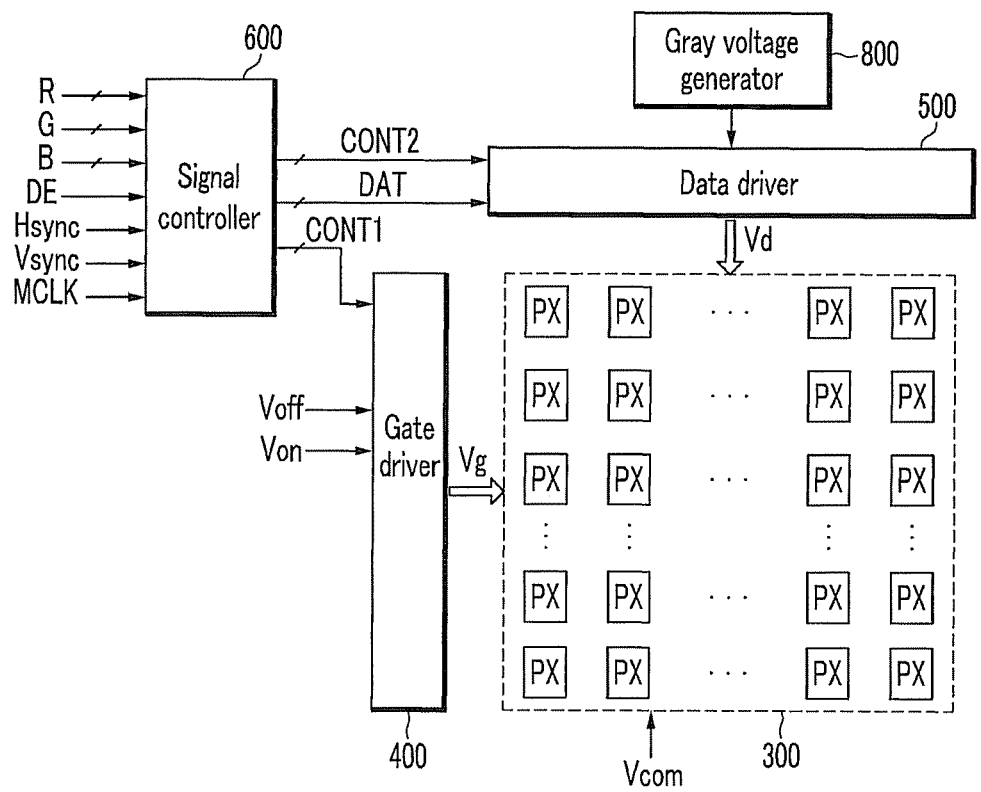
FIG. 1 is a block diagram of an exemplary embodiment of a liquid crystal display ("LCD") according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the present invention will be described in further detail with reference to the accompanying drawings.

Figure 2:
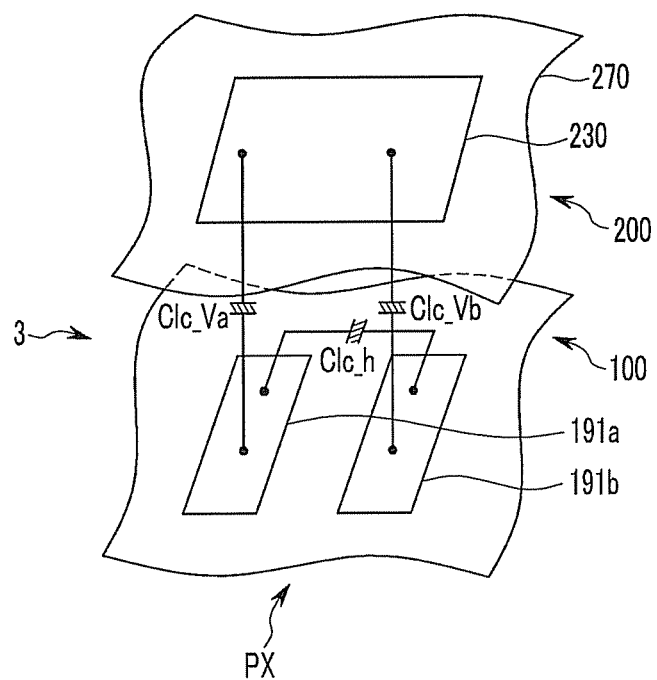
FIG. 2 is an equivalent circuit diagram of an exemplary embodiment of one pixel in a liquid crystal display according to the present invention.

FIG. 1 is a block diagram of an exemplary embodiment of a liquid crystal display ("LCD") according to the present invention, and FIG. 2 is an equivalent circuit diagram of an exemplary embodiment of one pixel in the LCD according to the present invention.

Referring to FIG. 1, a liquid crystal display according to an exemplary embodiment of the present invention includes a liquid crystal panel assembly 300, a gate driver 400, a data driver 500, a gray voltage generator 800 and a signal controller 600. The signal controller 600 receives input image signals R, G and B, as well as a data enable signal DE, a horizontal synchronization signal Hsync, a vertical synchronization signal Vsync and a main clock signal MCLK. The signal controller 600 outputs a gate control signal CONT1 to the gate driver 400, which generates gate voltages Vg, and outputs an image data signal DAT and a data control signal CONT2 to the data driver 500 to generate data voltages Vd using gray voltages received from the gray voltage generator 800.

Referring to FIG. 2, the liquid crystal panel assembly 300 includes a lower panel 100 and an upper panel 200 facing the lower panel 100, e.g., disposed opposite to the lower panel 100, and a liquid crystal layer 3 interposed therebetween.

Figure 4:
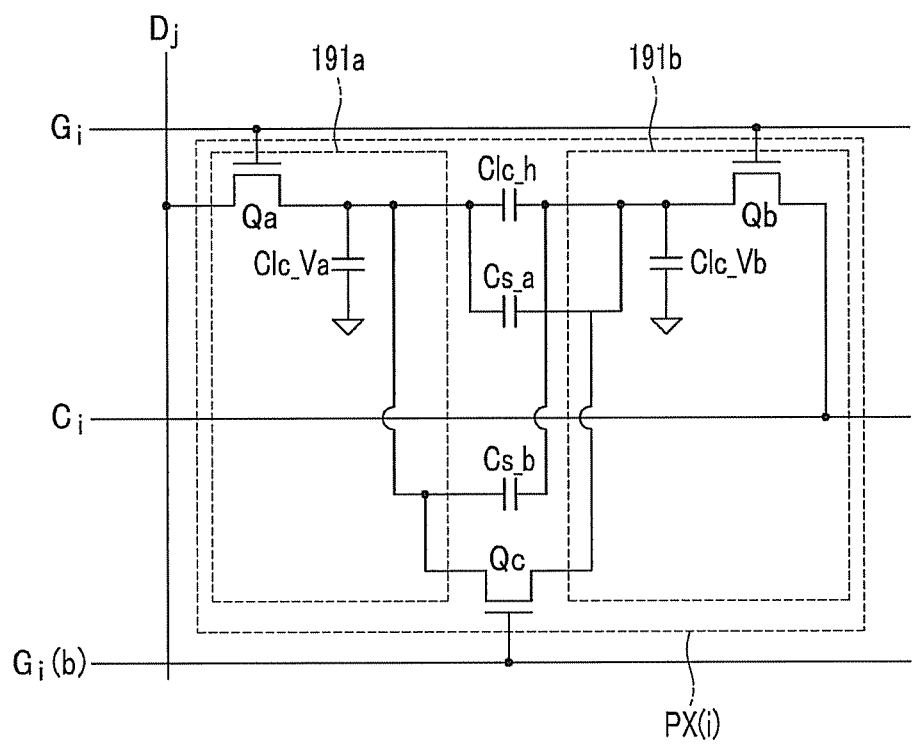
FIG. 4 is a schematic circuit diagram of an exemplary embodiment of one pixel in a liquid crystal display according to the present invention.

The liquid crystal capacitor includes a horizontal portion Clc_h corresponding to a first pixel electrode 191a and a second pixel electrode 191b of the lower panel 100 as two terminals and vertical portions Clc_Va and Clc_Vb respectively corresponding to the first pixel electrode 191a and the second pixel electrode 191b, and a common electrode 270 of the upper panel 200, as two terminals, and the liquid crystal layer 3 between the first and second pixel electrodes 191a and 191b and between the first and second pixel electrodes 191a and 191b and the common electrode 270 serves as a dielectric material. The first pixel electrode 191a is connected to a first switching element Qa (FIG. 4), and the second pixel electrode 191b is connected to a second switching element Qb (FIG. 4). The first switching element Qa and the second switching element Qb are connected to corresponding gate lines Gi (FIG. 4) and data lines Dj (FIG. 4).

The liquid crystal layer 3 has dielectric anisotropy, and liquid crystal molecules 31 (FIGS. 3A and 3B) of the liquid crystal layer 3 may be arranged such that their longitudinal axes are aligned substantially parallel to surfaces of the lower panel 100 and the upper panel 200 when an electric field is not applied to the liquid crystal layer 3. The liquid crystal layer 3 may have negative dielectric anisotropy, but additional exemplary embodiments are not limited thereto, and, in one or more additional exemplary embodiments, the liquid crystal layer 3 may have positive dielectric anisotropy, as will be discussed below.

The first and second pixel electrodes 191a and 191b may be formed in different layers from each other, or in the same layer on the lower panel 100. First and second storage capacitors Cs_a and Cs_b (FIG. 4) assist of the liquid crystal capacitor Clc and may be formed by overlapping separate electrodes (not shown) provided on the lower panel 100 and the first and second pixel electrodes 191a and 191b via an insulator while being interposed therebetween.

To display a color image, each pixel PX displays one of the primary colors (e.g., spatial division), or, alternatively, each pixel PX temporally and alternately displays the primary colors (e.g., temporal division). Thus, the primary colors (e.g., red, green and blue) are spatially or temporally synthesized, and thus a desired color is displayed. An LCD according to an exemplary embodiment that uses spatial division is shown in FIG. 2, where each pixel PX is provided with a color filter 230 corresponding to one of the primary colors on a region of the upper panel 200 corresponding to the first and second pixel electrodes 191a and 191b. However, in contrast to as shown in FIG. 2, the color filter 230 may be disposed on or below the first and second pixel electrodes 191a and 191b of the lower panel 100 in one or more additional exemplary embodiments.

At least one polarizer (not shown) for providing light polarization is provided in the liquid crystal panel assembly 300.

Figure 3A:
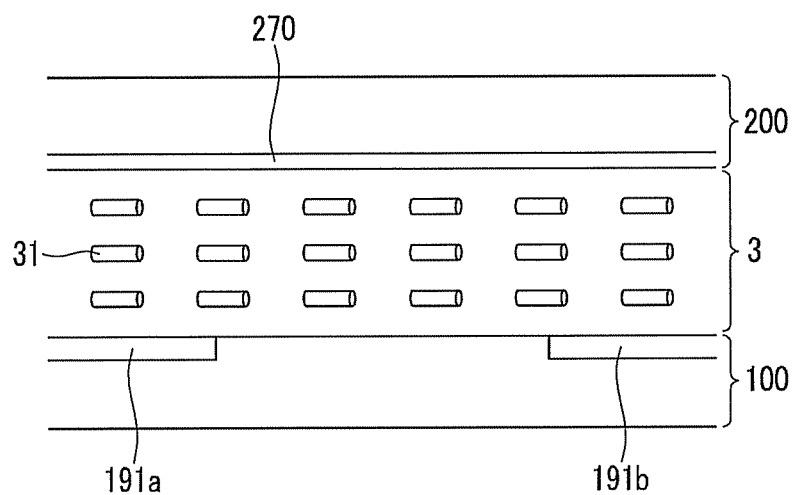
FIGS. 3A and 3B are partial cross-sectional views of an exemplary embodiment of a liquid crystal display according to the present invention.
Figure 3B:
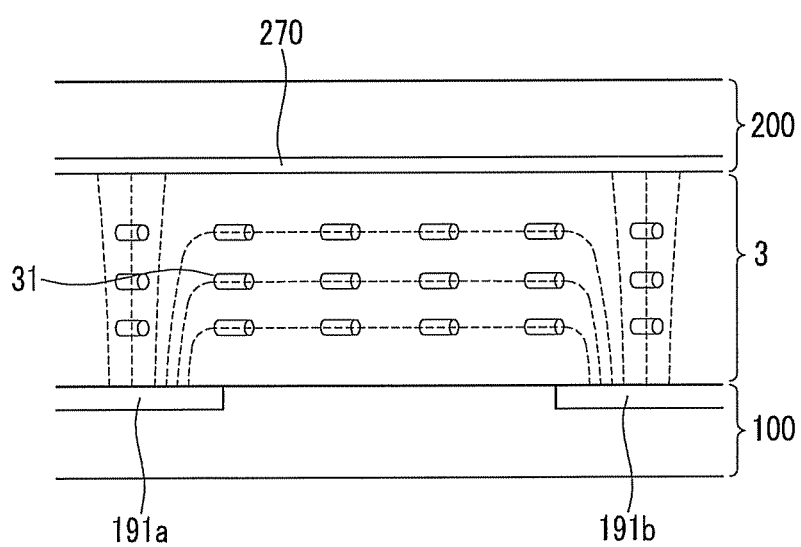

An operation of a liquid crystal display according to an exemplary embodiment of the present invention will now be described in further detail with reference to FIGS. 3A and 3B, as well as FIGS. 1 and 2. FIGS. 3A and 3B are partial cross-sectional views of an exemplary embodiment of a liquid crystal display according to the present invention. More particularly, FIG. 3A shows a state in which a voltage is not applied the liquid crystal display, and FIG. 3B shows a state in which a voltage is applied to the liquid crystal display.

Referring to FIG. 3A, liquid crystal molecules 31 in the liquid crystal layer 3, which is disposed between the lower panel 100 and the upper panel 200, are aligned in a predetermined direction substantially parallel to surfaces of the lower panel 100 and the upper panel 200. In another exemplary embodiment, alignment layers (not shown) may be disposed on surfaces inside the lower panel 100 and the upper panel 200, and, more particularly, the alignment layers may be horizontal alignment layers, although alternative exemplary embodiments are not limited thereto.

Referring to FIG. 3B, when the data voltage is supplied to a corresponding pixel PX through the switching element connected to the pixel electrodes 191a and 191b, and the common electrode 270 is supplied with the common voltage Vcom, a horizontal electric field is formed between the first pixel electrode 191a and the second pixel electrode 191b, and the horizontal electric field may be further enforced by the influence of the common voltage Vcom supplied to the common electrode 270 (as compared to a case in which the data voltage is only supplied between the first pixel electrode 191a and the second pixel electrode 191b). Thus, when the horizontal electric field is formed between the first pixel electrode 191a and the second pixel electrode 191b, the long axis of the liquid crystal molecules 31 is horizontally aligned to be substantially perpendicular to the direction of the electric field. A rotation degree of the liquid crystal molecules 31 changes according to a magnitude of the date voltage applied to the first and second pixel electrodes 191a and 191b (relative to the common voltage Vcom). Also, the change in degrees of the polarization of light that passes through the liquid crystal layer 3 changes according to a declination degree of the liquid crystal molecules 31. This change of polarization causes a change of transmittance through the polarizer, and the pixels PX thereby display images of a desired luminance.

In one or more exemplary embodiments, the data voltages applied to the first and second pixel electrodes 191a and 191b are voltages corresponding to the luminance to be displayed with the pixel PX, and may have opposite polarities with respect to the common voltage Vcom.

Thus, the data voltages having the opposite polarities with respect to the common voltage Vcom are supplied to one pixel PX, such that the driving voltage is increased, the response speed of the liquid crystal molecules may is substantially improved, and the transmittance of the liquid crystal display is significantly increased. Also, the data voltages supplied to one pixel PX are of opposite polarities, such that degradation of the display quality, due to flicker, for example, is effectively prevented during driving of the data driver 500 using driving methods such as column inversion, row inversion and/or dot inversion.

An arrangement of a signal line and a pixel of a liquid crystal display and a driving method thereof according to an exemplary embodiment of the present invention will now be described in further detail with reference to FIG. 4, as well as FIG. 2. FIG. 4 is a schematic circuit diagram of an exemplary embodiment of one pixel of a liquid crystal display according to the present invention.

Referring to FIG. 2 and FIG. 4, a liquid crystal display according to an exemplary embodiment includes pixels PX(i), each including a first pixel electrode 191a and a second pixel electrode 191b, and a plurality of signal lines Gi(a), Gi(b), Ci, and Dj connected thereto. The plurality of signal lines Gi(a), Gi(b), Ci, and Dj include a plurality of pairs of gate lines Gi(a) and Gi(b) for transmitting a gate signal (also referred to as "scanning signal"), data lines Dj for transmitting a data voltage and voltage supplying lines Ci for transmitting a first voltage having a substantially uniform magnitude, such as the common voltage Vcom.

each of the pixels PX(i) (where i=1, 2, ..., n) includes a first switching element Qa, a second switching element Qb and a third switching element Qc connected to the plurality of signal lines Gi(a), Gi(b), Ci, and Dj, liquid crystal capacitors Clc_h, Clc_Va, and Clc_Vb, a first sharing capacitor Cs_a and a second sharing capacitor Cs_b connected thereto.

The first switching element Qa, the second switching element Qb and the third switching element Qc are three-terminal elements such as a thin film transistor ("TFT") provided in the lower panel 100, and the first switching element Qa has a control terminal connected to a first gate line Gi(a) of a pair of gate lines Gi(a) and Gi(b), an input terminal connected to a data line Dj, and an output terminal connected to the first sharing capacitor Cs_a and the liquid crystal capacitors Clc_h and Clc_Va. The second switching element Qb has a control terminal connected to a second gate line Gi(b) (of the pair of pair of gate lines Gi(a) and Gi(b)), an input terminal connected to the voltage supplying line Ci, and an output terminal connected to the liquid crystal capacitors Clc_h and Clc_Vb and the second sharing capacitor Cs_b. The third switching element Qc has a control terminal connected to the second gate line Gi(b) of the pair of gate lines Gi(a) and Gi(b), an input terminal connected to the second sharing capacitor Cs_b, and an output terminal connected to the first sharing capacitor Cs_a. The first sharing capacitor Cs_a includes an output terminal of the first switching element Qa connected to the first pixel electrode 191a and the second pixel electrode 191b as two terminals thereof, and the second sharing capacitor Cs_b has the output terminal of the second switching element Qb connected to the second pixel electrode 191b and the first pixel electrode 191a as two terminals thereof. As shown in FIG. 4, the liquid crystal capacitor includes a portion Clc_h having the first pixel electrode 191a and the second pixel electrode 191b of the lower panel 100 as two terminals, and portions Clc_Va and Clc_Vb respectively having the first pixel electrode 191a and the second pixel electrode 191b, and the common electrode 270 of the upper panel 200, as two terminals.

An operation of a liquid crystal display according to an exemplary embodiment will now be described in further detail.

When the first gate signal applied to the first gate line Gi(a) is changed from the gate-off voltage Voff to the gate-on voltage Von, the first and second switching elements Qa and Qb connected thereto are turned on. Accordingly, the data voltage supplied to the data line Dj is supplied to the first pixel electrode 191a and the first sharing capacitor Cs_a through the turned-on first switching element Qa, while the first voltage applied to the voltage supplying line Ci is supplied to the second pixel electrode 191b and the second sharing capacitor Cs_b through the turned-on second switching element Qb. In an exemplary embodiment, an absolute value of the data voltage supplied to the first pixel electrode 191a is greater than an absolute value of the first voltage, e.g., the common voltage Vcom, supplied to the second pixel electrode 191b. Thus, a magnitude of the first voltage may be substantially the same as a magnitude of the common voltage Vcom supplied to the common electrode 270.

When the first gate signal is changed from the gate-on voltage Von to the gate-off voltage Voff, and, simultaneously, the second gate signal supplied to the second gate line Gi(b) is changed from the gate-off voltage Voff to the gate-on voltage Von, the first and second switching elements Qa and Qb are turned off and the third switching element Qc is turned on. Thus, charges are moved, e.g., are transferred, from the second sharing capacitor Cs_b to the first sharing capacitor Cs_a by, e.g., through, the third switching element Qc, such that a potential of the second sharing capacitor Cs_b decreases and a potential of the first sharing capacitor Cs_a increases.

On the other hand, the first pixel electrode 191a and the second pixel electrode 191b are electrically floated when the third switching element Qc is turned on. Accordingly, the potential of the first sharing capacitor Cs_a increases and the potential of the second sharing capacitor Cs_b decreases, such that the potential of the first pixel electrode 191a increases while the potential of the second pixel electrode 191b decreases.

Therefore, the voltage of the first pixel electrode 191a is greater than the first voltage, and the voltage of the second pixel electrode 191b is less than the first voltage, such that the first pixel electrode 191a and the second pixel electrode 191b (of one pixel PX) are supplied with the two voltages having the different polarities with respect to the common voltage Vcom. The storage capacitance of both the first sharing capacitor Cs_a and the second sharing capacitor Cs_b may be controlled to control the magnitude of the voltage charged to the first pixel electrode 191a and the second pixel electrode 191b.

Generally, when one pixel PX is divided into the two pixel electrodes 191a and 191b, and voltages having different polarities are supplied through different switching elements to charge the liquid crystal capacitor Clc with the voltage of the desired voltage magnitude, one pixel must be connected to one gate line and two different data lines. Put another way, the first and second switching elements connected to the first and second pixel electrodes of each pixel are connected to the same gate line, however they are connected to different data lines such that the data voltages are applied through the different data lines.

However, one pixel of the liquid crystal display according to an exemplary embodiment is connected to two gate lines (e.g., the pair of gate lines), one data line and one voltage supplying line. Accordingly, a required number of data lines is decreased, and the driver cost of the liquid crystal display is substantially reduced in an exemplary embodiment. Additionally, even though, the gate lines are formed in pairs, such that the number of gate lines is increased, the gate signals are only gate-on/off signals, e.g., are only two signals, and the operation of the gate driver is simple as compared with the data driver, such that the manufacturing cost of the liquid crystal display is still low. Also, even though the voltage supplying lines are added, the voltage supplying lines are supplied with the first voltages having the same magnitude, such that a comparatively simple driver is used to supply the first voltage, and, accordingly, the driving method is simple and the cost thereof is low in the exemplary embodiment described herein.

Figure 5:
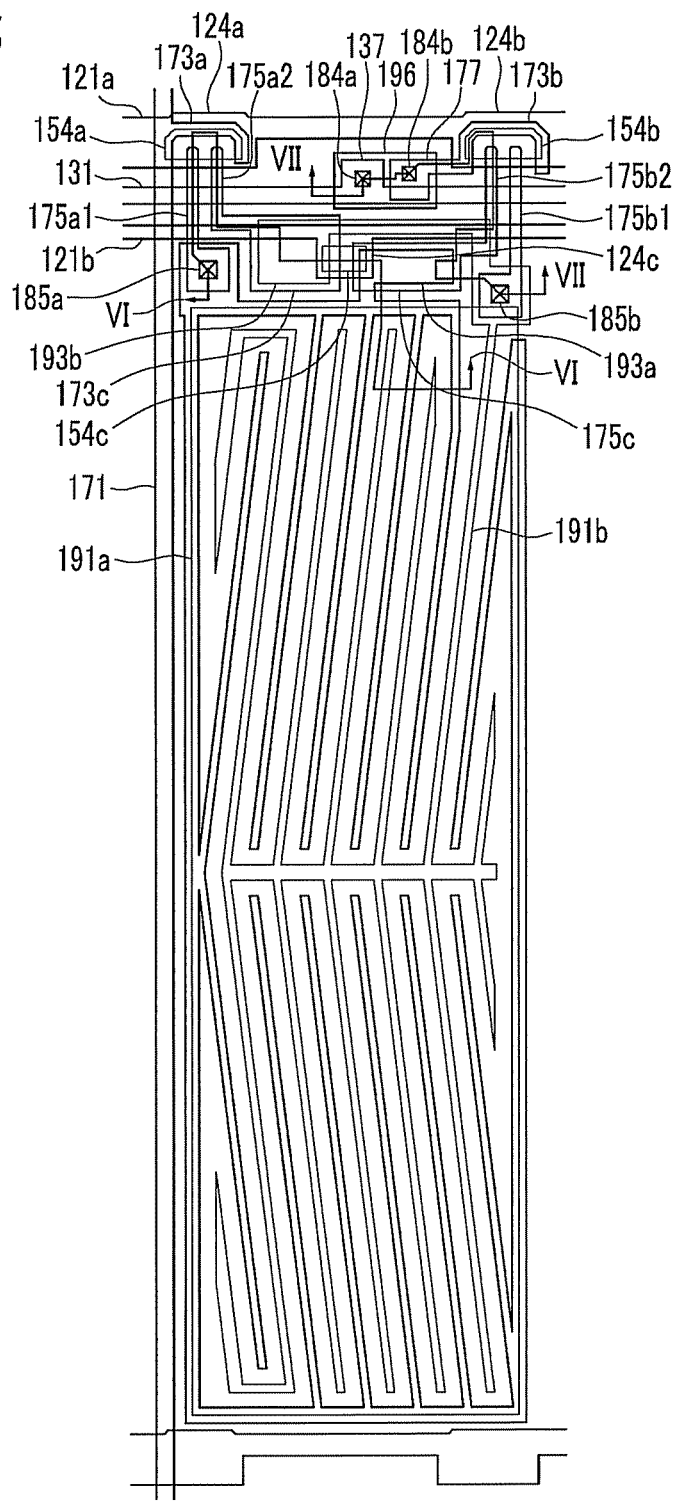
FIG. 5 is a plan view of an exemplary embodiment of a liquid crystal panel assembly according to the present invention.

An example of an exemplary embodiment of the liquid crystal panel assembly 300 described above will now be described in further detail with reference to FIGS. 5-7. FIG. 5 is a plan view of an exemplary embodiment of a liquid crystal panel assembly according to the present invention, FIG. 6 is a partial cross-sectional view taken along line VI-VI of FIG. 5, and FIG. 7 is a partial cross-sectional view taken along line VII-VII of FIG. 5.

Figure 6:
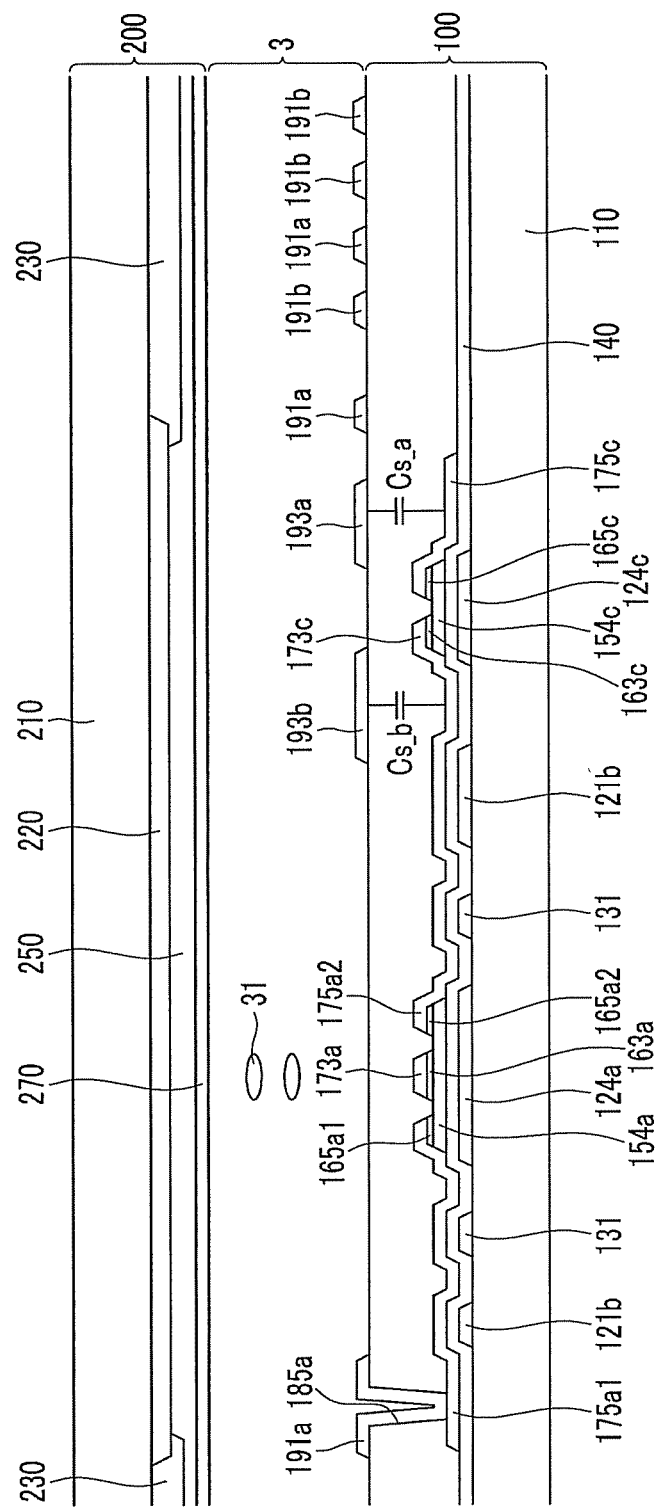
FIG. 6 is a partial cross-sectional view taken along line VI-VI of FIG. 5.
Figure 7:
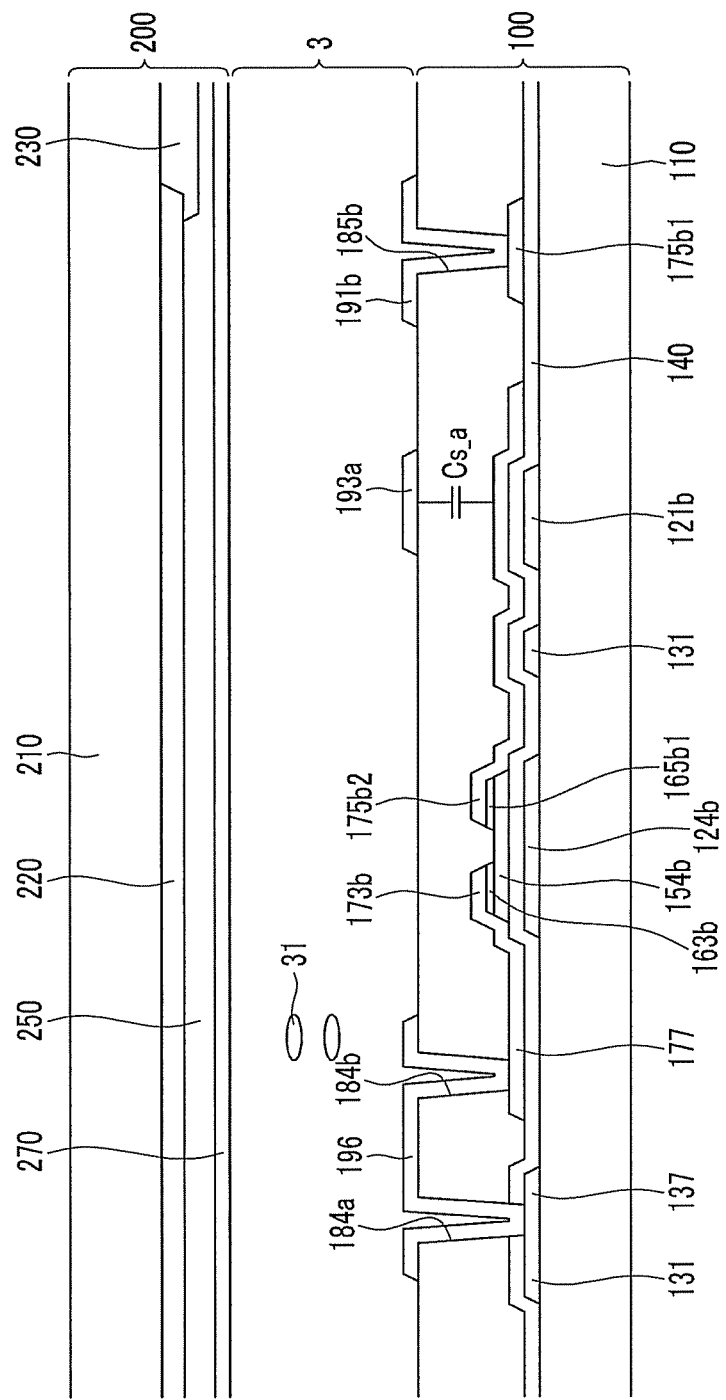
FIG. 7 is a partial cross-sectional view taken along line VII-VII of FIG. 5.

Referring to FIGS. 5-7, a liquid crystal panel assembly 300 according to an exemplary embodiment of the present invention includes a lower panel 100 and an upper panel 200 facing each other, e.g., disposed opposite each other, and a liquid crystal layer 3 interposed between the lower panel 100 and the upper panel 200.

The lower panel 100 includes a plurality of gate conductors, including first gate lines 121a, second gate lines 121b and voltage supplying lines 131 (hereinafter collectively referred to as "gate conductors 121a, 121b and 131"), are disposed on an insulation substrate 110.

The first gate line 121a and the second gate line 121b transmit gate signals and extend substantially along a first, transverse direction, e.g., along a horizontal direction (as shown in FIG. 5), the first gate line 121a includes a first gate electrode 124a and a second gate electrode 124b protruding downward from the first gate line 121a (as viewed in FIG. 5), and the second gate line 121b includes a third gate electrode 124c protruding downward from the second gate line 121b.

The voltage supplying line 131, which receives the first voltage, is disposed substantially parallel to the first gate lines 121a and the second gate lines 121b, and may be disposed between the first gate line 121a and the second gate line 121b. The voltage supplying line 131 includes an expansion 137.

The gate conductors 121a, 121b and 131 may include a single-layered or, alternatively, a multi-layered structure.

A gate insulating layer 140, which may be made of silicon nitride (SiNx) or silicon oxide (SiOx), is disposed on the gate conductors 121a, 121b, and 131.

A first semiconductor island 154a, a second semiconductor island 154b and a third semiconductor island 154c, which may include hydrogenated amorphous silicon ("a-Si") or polysilicon ("p-Si"), are disposed on the gate insulating layer 140. The first semiconductor island 154a, the second semiconductor island 154b and the third semiconductor island 154c are disposed on the first gate electrode 124a, the second gate electrode 124b, and the third gate electrode 124c, respectively.

Ohmic contacts 163a, 165a1 and 165a2 are disposed on the first semiconductor island 154a, ohmic contacts 163b and 165b1 are disposed on the second semiconductor island 154b, and ohmic contacts 163c and 165c are disposed on the third semiconductor island 154c. The ohmic contacts 163a, 165a1, 165a2, 163b, 165b1, 163a and 165c may be made of a material such as n+ hydrogenated amorphous silicon, in which an n-type impurity such as phosphorus is doped with a high concentration, or of silicide, but alternative exemplary embodiments are not limited thereto.

A data conductor, including a data line 171, a first drain electrode 175a formed as a pair of first drain electrodes 175a1 and 175a2, a second source electrode 173b, and second drain electrodes 175b formed as a pair 175b1 and 175b2, are disposed on the ohmic contacts 163a, 165a1, 165a2, 163b, 165b1, 163a and 165c and the gate insulating layer 140.

The data line 171 is for transmitting the data signal and extends along a substantially longitudinal direction, e.g., along a second or vertical direction, substantially perpendicular to the first direction), to intersect the first gate lines 121a, the second gate lines 121b and the voltage supplying line 131. The data line 171 includes a first source electrode 173a. One end of the second source electrode 173b is expanded, thereby forming an expansion 177. A first sub-drain electrode 175a1 of the first drain electrodes 175a forming the pair includes one end of a bar type and the other end having a wide area, and a second sub-drain electrode 175a2 is connected to a third source electrode 173c. The third sub-drain electrode 175b1 of the second drain electrodes 175b1 and 175b2 forming the pair includes one end of a bar type and the other end having a wide area, and the fourth sub-drain electrode 175b2 is connected to a third drain electrode 175c.

The first gate electrode 124a, the first source electrode 173a and the first pair of drain electrodes 175a1 and 175a2 form a first thin film transistor ("TFT") Qa along with the first semiconductor island 154a, and the channel of the first thin film transistor Qa is formed in the first semiconductor island 154a between the first source electrode 173a and the first pair of drain electrodes 175a1 and 175a2. The second gate electrode 124b, the second source electrode 173b, and the second pair drain electrodes 175b1 and 175b2 form a second thin film transistor Qb along with the second semiconductor island 154b, and the third gate electrode 124c, the third source electrode 173c, and the third drain electrode 175c form a third thin film transistor Qc along with the third semiconductor island 154c. Hereinafter, various combinations of the two or more of the abovementioned components will be collectively referred to as "data conductors."

The data conductors 171, 173b, 175a1, 175a2, 175b1 and 175b2 may include a single-layered or, alternatively, a multi-layered structure.

A passivation layer 180 is disposed on the data conductors 171, 173b, 175a1, 175a2, 175b1 and 175b2 and the exposed first, second and third semiconductors 154a, 154b and 154c, respectively.

The passivation layer 180 includes contact holes 184a, 185a and 185b respectively exposing end portions (not shown) of the data line 171, the expansion 177 of the second source electrode 173b, the wide end of the first sub-drain electrode 175a1, and the wide end of the third sub-drain electrode 175b1, and the passivation layer 180 and the gate insulating layer 140 have a contact hole 184b exposing the end (not shown) of the first gate lines 121a, the second gate lines 121b and the expansion 137 of the voltage supplying line 131.

A first pixel electrode 191a, a second pixel electrode 191b, and a connecting member 196 are disposed on the passivation layer 180. The first pixel electrode 191a includes a first capacitor electrode 193a, and the second pixel electrode 191b includes a second capacitor electrode 193b.

The first pixel electrode 191a and the second pixel electrode 191b include a transverse portion and a plurality of branches protruding from the transverse portion. The branches form an acute angle with the data line 171. The branches of the first pixel electrode 191a and the branches of the second pixel electrode 191b engage with each other with a predetermined gap and are alternately disposed, thereby forming a pectinated pattern, e.g., a comb-like patter, as shown in FIG. 5.

It will be noted that the shape of the first pixel electrode 191a and the second pixel electrode 191b of one pixel PX of the liquid crystal panel assembly according to another exemplary embodiment of the present invention is not limited to the foregoing description, and that the first pixel electrode 191*a* and the second pixel electrode 191*b* may include any number of shapes in which at least portions of the first pixel electrode 191*a* and the second pixel electrode 191*b* are formed in a same layer and are alternately arranged, e.g., are interdigitated.

The expansion 137 of the voltage supplying line 131 and the second source electrode 173*b* exposed through the contact holes 184*a* and 184*b* are physically and electrically connected to each other by the connecting member 196.

The first pixel electrode 191*a* is physically and electrically connected to the first sub-drain electrode 175*a*1 through the contact hole 185*a* to thereby receive the data voltage from the first sub-drain electrode 175*a*1, and the second pixel electrode 191*b* is physically and electrically connected to the third sub-drain electrode 175*b*1 through the contact hole 185*b* to thereby receive the first voltage from the third sub-drain electrode 175*b*1. The first capacitor electrode 193*a* of the first pixel electrode 191*a* and the fourth sub-drain electrode 175*b*2 overlap each other and have the passivation layer 180 interposed therebetween to form the first sharing capacitor Cs_a, and the second capacitor electrode 193*b* of the second pixel electrode 191*b* and the second sub-drain electrode 175*a*2 overlap each other with the passivation layer 180 interposed therebetween to form the second sharing capacitor Cs_b.

Still referring to FIGS. 5-7, the upper panel 200 according to an exemplary embodiment includes a light blocking member 220 disposed on an insulation substrate 210. The light blocking member 220 may be a black matrix, and prevents light leakage.

Color filters 230 are disposed on the insulation substrate 210. The color filters 230 are disposed within an area surrounded by the light blocking member 220, and may extend longitudinally along columns of the first pixel electrode 191*a* and/or the second pixel electrode 191*b* along the longitudinal direction. The color filters 230 may represent one color such as one of the three primary colors red, green and blue.

An overcoat 250 is disposed on the color filters 230 and the light blocking member 220.

A common electrode 270 is disposed on the overcoat 250.

Alignment layers (not shown) are disposed on inner surfaces of lower panel 100 and the upper panel 200, and the alignment layers may be horizontal alignment layers.

The liquid crystal molecules 31 of the liquid crystal layer 3 may have negative dielectric anisotropy, and may be aligned such that the directors thereof are aligned substantially parallel to the surfaces of the lower panel 100 and the upper panel 200 when an electric field is not applied.

Driving simulation results of a liquid crystal display according to an exemplary embodiment of the present invention will now be described in further detail with reference to FIG. 8A and FIG. 8B, as well as FIG. 4.

Figure 8A:
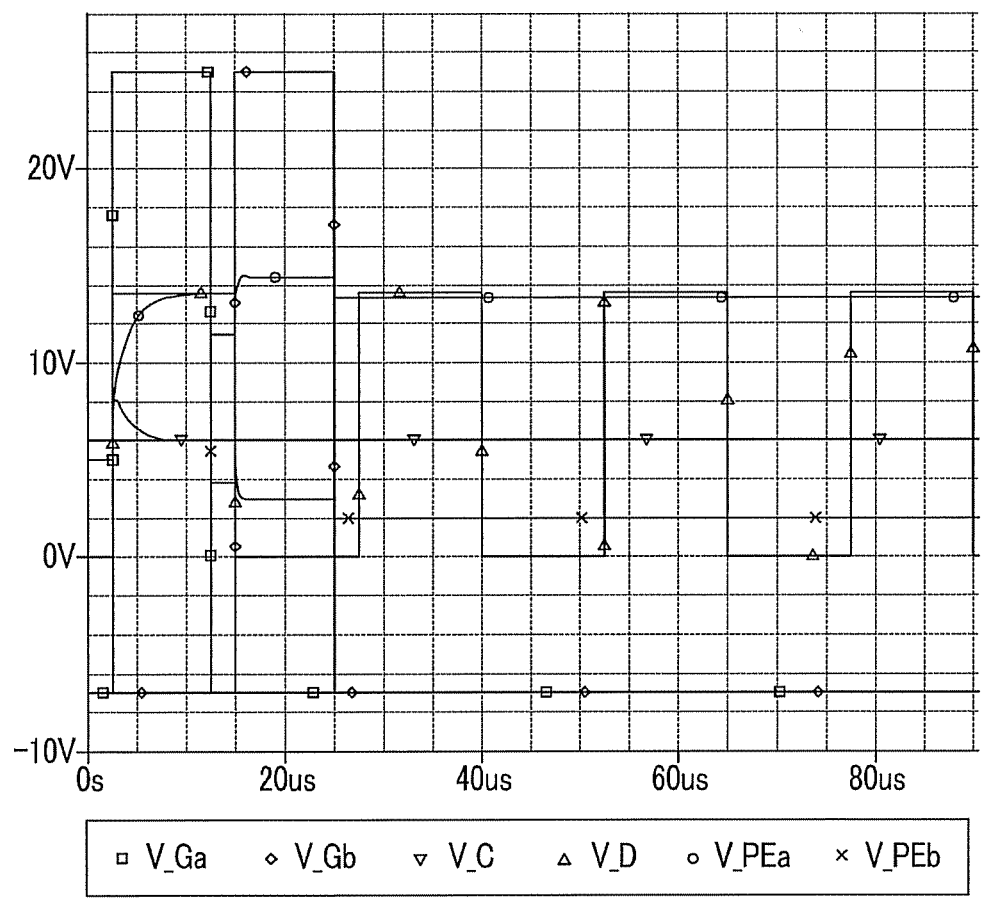
FIGS. 8A and 8B are graphs of voltage versus time showing driving simulation results of an exemplary embodiment of a liquid crystal display according to the present invention.
Figure 8B:
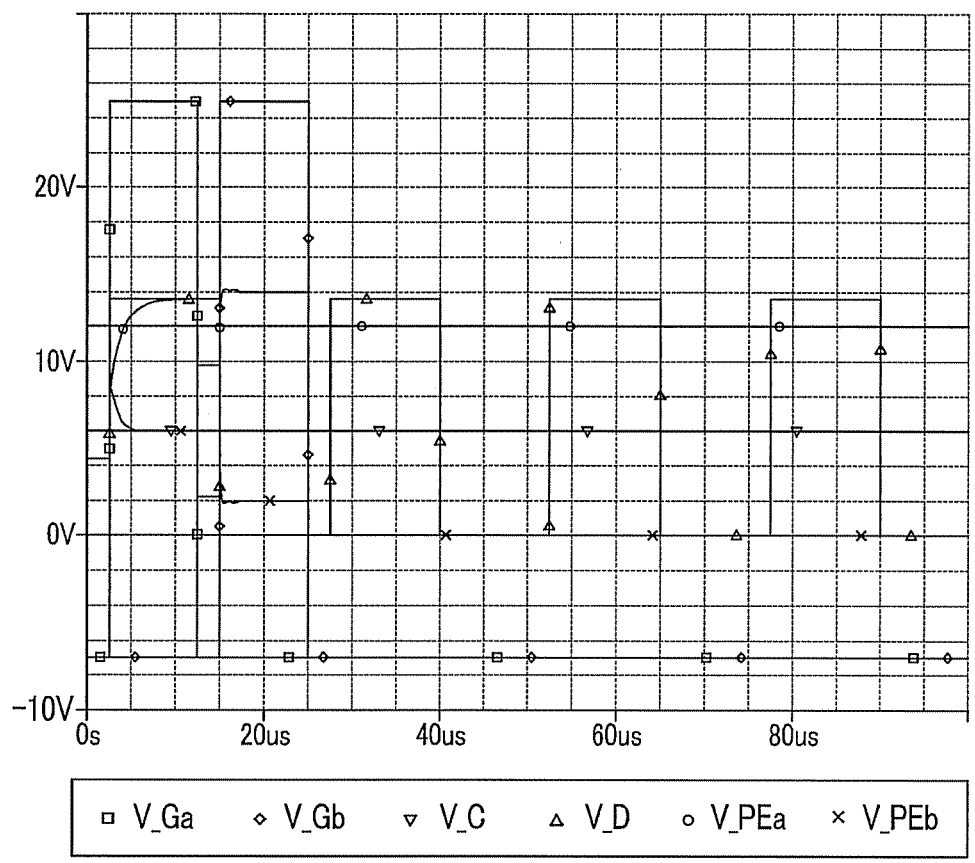

FIG. 8A and FIG. 8B are graphs of voltage, in volts (V), versus time, in microseconds (μs), showing driving simulation results of one experimental example of an exemplary embodiment of a liquid crystal display according to the present invention. In the experimental example, liquid crystal having dielectric anisotropy of about −5 is used.

In FIG. 8A and FIG. 8B, the voltage supplied to the first gate line Gi(a) is represented by line V_Ga, the voltage applied to the second gate line Gi(b) is represented by line V_Gb, the voltage supplied to the voltage supplying line Ci is represented by line V_C, the voltage supplied to the data line Dj is represented by line V_D, and the voltages supplied to the first pixel electrode 191*a* and the second pixel electrode 191*b* are represented by lines V_PEa and V_PEb, respectively.

As shown in FIG. 8A, when the potential applied to the voltage supplying line Ci is about 6V, the voltages finally supplied to the first pixel electrode 191*a* and the second pixel electrode 191*b* are about 13V and about 2V, respectively, and have positive polarity and negative polarity, respectively, with respect to the first voltage of about 6V. Thus, the liquid crystal display according to an exemplary embodiment of the present invention supplies voltages having different polarities (with respect to the first voltage having a uniform magnitude as the common voltage Vcom) to the first and second pixel electrodes 191*a* and 191*b*, by using only one data line Dj and only one voltage supplying line Ci.

As shown in FIG. 8B, the capacitance of the first sharing capacitor Cs_a is greater than the capacitance of the second sharing capacitor Cs_b, as compared with FIG. 8A. Thus, referring to FIG. 8B, when the potential applied to the voltage supplying line Ci is about 6V, the voltages finally applied to the first pixel electrode 191*a* and the second pixel electrode 191*b* are about 12V and about 0V, respectively, and have the positive polarity and the negative polarity (with respect to the first voltage of 6V), and are symmetrical with respect to the first voltage of about 6V. In this way, the liquid crystal display according to an exemplary embodiment of the present invention supplies the voltages having the different polarities, with respect to the first voltage having the same magnitude as the common voltage Vcom, and the values that are symmetrical to each other to two pixel electrodes 191*a* and 191*b* by using one data line Dj and one voltage supplying line Ci and by controlling the capacitance of the first sharing capacitor Cs_a and the second sharing capacitor Cs_b.

Figure 9:
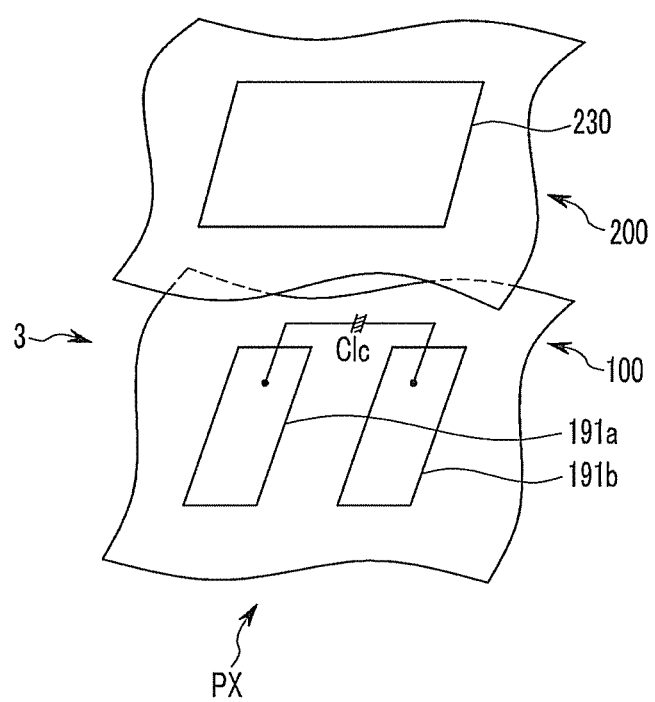
FIG. 9 is an equivalent circuit diagram of one pixel of another exemplary embodiment of one pixel in a liquid crystal display according to the present invention.
Figure 10:
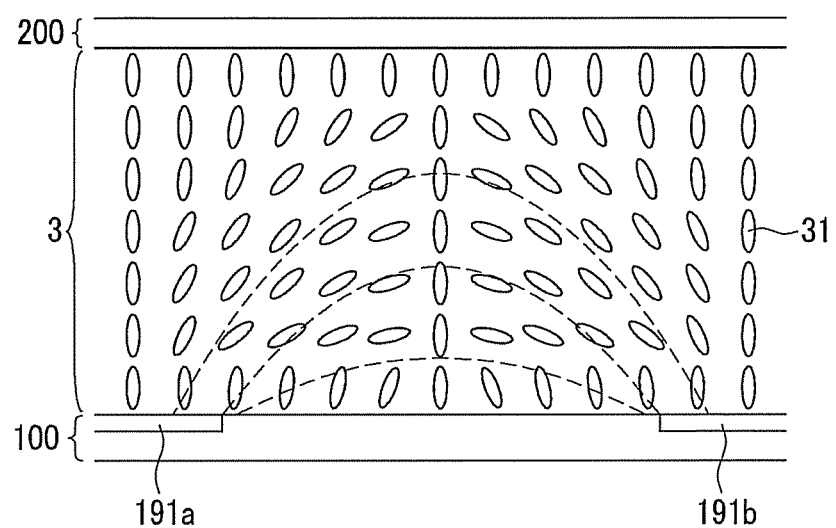
FIG. 10 is a partial cross-sectional view of yet another exemplary embodiment of a liquid crystal display according to the present invention.
Figure 11:
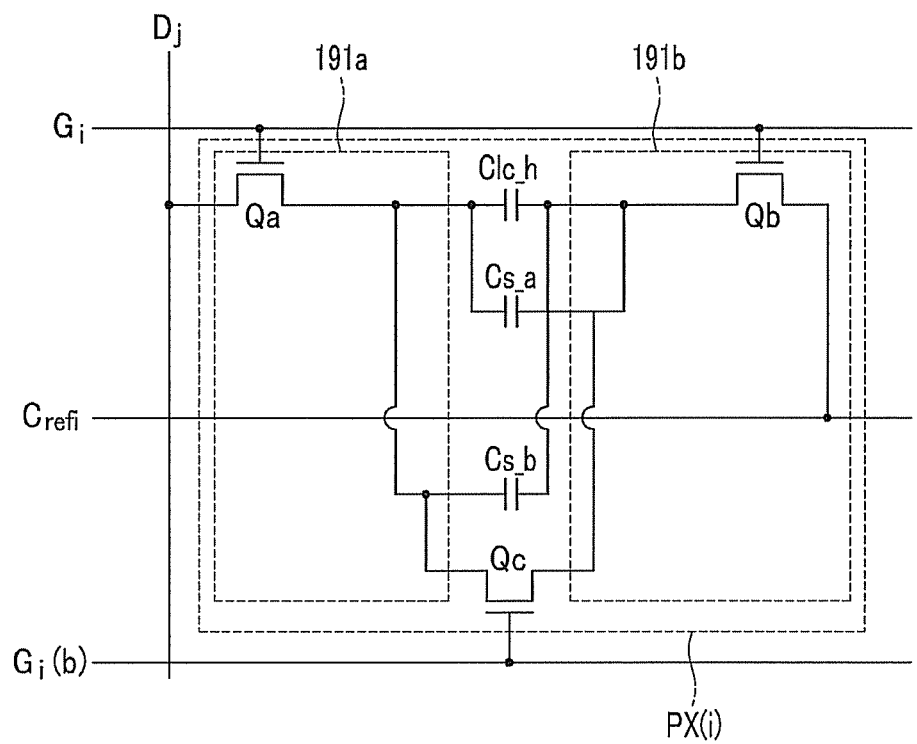
FIG. 11 is a schematic circuit diagram of an exemplary embodiment of two pixels in a liquid crystal display according to the present invention.

A liquid crystal display according to another exemplary embodiment of the present invention will now be described in further detail with reference to FIGS. 9-11. FIG. 9 is an equivalent circuit diagram showing an exemplary embodiment of one pixel of an LCD according to the present invention, FIG. 10 is a partial cross-sectional view of an exemplary embodiment of a liquid crystal display according to the present invention, and FIG. 11 is an equivalent circuit diagram of an exemplary embodiment of two pixels in a liquid crystal display according to the present invention.

Referring to FIG. 9, a liquid crystal display according to an exemplary embodiment includes a lower panel 100 and an upper panel 200 facing the lower panel 100, and a liquid crystal layer 3 interposed therebetween.

The liquid crystal capacitor Clc uses the first pixel electrode 191*a* and the second pixel electrode 191*b* of the lower panel 100 as two terminals thereof, and the liquid crystal layer 3 between the first and second pixel electrodes 191*a* and 191*b* serves as a dielectric material thereof. The first pixel electrode 191*a* is connected to a first switching element (not shown), and the second pixel electrode 191*b* is connected to a second switching element (not shown). The first switching element and the second switching element are connected to a corresponding gate line (not shown) and a corresponding data line (not shown).

The liquid crystal layer 3 has dielectric anisotropy, and liquid crystal molecules 31 of the liquid crystal layer 3 may be arranged such that their long axes are aligned substantially perpendicular to surfaces of the lower panel 100 and the upper panel 200 when an electric field is not applied to the liquid crystal layer 3. The liquid crystal layer 3 may have positive dielectric anisotropy.

First and second storage capacitors (not shown) assist the liquid crystal capacitor Clc and may be formed by overlapping separate electrodes (not shown) provided on the lower panel 100 and the first and second pixel electrodes 191*a* and 191*b* with an insulator interposed therebetween.

An operation of a liquid crystal display according to an exemplary embodiment of the present invention will now be described in further detail with reference to FIGS. 9 and 10.

Referring to FIGS. 9 and 10, a voltage is supplied to a corresponding pixel PX through the associated switching elements connected to the first and second pixel electrodes 191a and 191b. In an exemplary embodiment, the voltages supplied to the first pixel electrode 191a and the second pixel electrode 191b correspond to the luminance for displaying a desired image with the pixel PX, and may have opposite polarities with respect to a reference voltage.

The difference between two data voltages applied to first and second pixel electrodes 191a and 191b and having opposite polarities is expressed as a charged voltage of the liquid crystal capacitors Clc, e.g., a pixel voltage. When a potential difference is generated between two terminals of the liquid crystal capacitor Clc, as shown in FIG. 10, an electric field substantially parallel to the surface of the lower panel 100 and the upper panel 200 is formed in the liquid crystal layer 3 between the first and second pixel electrodes 191a and 191b. When the liquid crystal molecules 31 have positive dielectric anisotropy, the liquid crystal molecules 31 are arranged such that the long axes thereof are aligned substantially parallel to the direction of the electric field, and the degree of inclination is changed according to the magnitude of the pixel voltage, which is referred to as an electrically-induced optical compensation ("EOC") mode liquid crystal layer 3. Also, the change in degree of the polarization of light passing through the liquid crystal layer 3 is changed according to the inclination degree of the liquid crystal molecules 31. The change of the polarization appears as a change of transmittance of light through the polarizer, and accordingly, the pixel PX displays the desired predetermined luminance.

As described in greater detail above, one pixel PX is supplied with two data voltages, having different polarities with respect to the reference voltage, such that the driving voltage is increased and a response speed of the liquid crystal molecules 31 is increased, and a transmittance of the liquid crystal display is therefore increased. Also, the polarities of two data voltages applied to one pixel PX are opposite to each other, and degradation of the display quality, due to flicker, for example, is effectively prevented when driving the display device using column inversion, row inversion and/or dot inversion.

Also, when the first and second switching elements are turned off in one pixel PX, the voltages supplied to the first and second pixel electrodes 191a and 191b are decreased by a kickback voltage, such that the charging voltage of the pixel PX is not significantly changed. Accordingly, the display characteristics of the liquid crystal display according to one or more exemplary embodiments are further improved.

An arrangement of signal lines and pixels and a driving method of the liquid crystal device according to an exemplary embodiment of the present invention will now be described in further detail with reference to FIG. 11, as well as FIG. 9. FIG. 11 is an equivalent circuit diagram of one pixel of a liquid crystal display according to another exemplary embodiment of the present invention.

Referring to FIG. 9 and FIG. 11, a liquid crystal display according to an exemplary embodiment includes pixels PX(i), each having the first pixel electrode 191a and the second pixel electrode 191b, and a plurality of signal lines Gi(a), Gi(b), Ci and Dj connected thereto. The plurality of signal lines Gi(a), Gi(b), Ci and Dj include a plurality of pairs of gate lines Gi(a) and Gi(b) for transmitting a gate signal, data lines Dj for transmitting a data voltage, and voltage supplying lines Ci transmitting for transmitting a first voltage having a predetermined value.

The pixels PX(i) (where i=1, 2, ..., n) include the first switching element Qa, the second switching element Qb and the third switching element Qc connected to the plurality of signal lines Gi(a), Gi(b), Ci and Dj, and liquid crystal capacitors Clc_h, Clc_Va, and Clc_Vb, the first sharing capacitor Cs_a, and the second sharing capacitor Cs_b connected thereto.

In an exemplary embodiment, the first switching element Qa, the second switching element Qb and the third switching element Qc are three-terminal elements such as a thin film transistor ("TFT") provided in the lower panel 100, and the first switching element Qa has a control terminal connected to the first gate line Gi(a) of a pair of the gate lines Gi(a) and Gi(b), an input terminal connected to the data line Dj, and an output terminal connected to the first sharing capacitor Cs_a and the liquid crystal capacitors Clc_h and Clc_Va. The second switching element Qb has a control terminal connected to the second gate line Gi(b) of the pair of the gate lines Gi(a) and Gi(b), an input terminal connected to the voltage supplying line Ci, and an output terminal connected to the liquid crystal capacitors Clc_h and Clc_Vb and the second sharing capacitor Cs_b The third switching element Qc has a control terminal connected to the second gate line Gi(b) of the pair of gate lines Gi(a) and Gi(b), an input terminal connected to the second sharing capacitor Cs_b, and an output terminal connected to the first sharing capacitor Cs_a. The first sharing capacitor Cs_a includes the output terminal of the first switching element Qa connected to the first pixel electrode 191a and the second pixel electrode 191b as two terminals, and the second sharing capacitor Cs_b has the output terminal of the second switching element Qb connected to the second pixel electrode 191b and the first pixel electrode 191a as two terminals. As shown in FIG. 11, the liquid crystal capacitor includes the first pixel electrode 191a and the second pixel electrode 191b of the lower panel 100 as two terminals thereof.

An operation of a liquid crystal display according to an exemplary embodiment will now be described in further detail.

When the first gate signal, supplied to the first gate line Gi(a), changes from the gate-off voltage Voff to the gate-on voltage Von, the first and second switching elements Qa and Qb connected thereto are turned on. Accordingly, the data voltage supplied to the data line Dj is supplied to the first pixel electrode 191a and the first sharing capacitor Cs_a through the turned-on first switching element Qa, and the first voltage supplied to the voltage supplying line Ci is supplied to the second pixel electrode 191b and the second sharing capacitor Cs_b through the turned-on second switching element Qb. In an exemplary embodiment, an absolute value of the data voltage supplied to the first pixel electrode 191a is greater than an absolute value of the first voltage supplied to the second pixel electrode 191b.

When the first gate signal changes from the gate-on voltage Von to the gate-off voltage Voff, and, simultaneously, the second gate signal supplied to the second gate line Gi(b) changes from the gate-off voltage Voff to the gate-on voltage Von, the first and second switching elements Qa and Qb are turned off and the third switching element Qc is turned on. Thus, charges are moved, e.g., are transferred, from the second sharing capacitor Cs_b to the first sharing capacitor Cs_a by (through) the third switching element Qc such that the potential of the second sharing capacitor Cs_b decreases and the potential of the first sharing capacitor Cs_a increases.

On the other hand, the first pixel electrode 191a and the second pixel electrode 191b are electrically floated when the third switching element Qc is turned on. Accordingly, the potential of the first sharing capacitor Cs_a increases and the potential of the second sharing capacitor Cs_b decreases such that the potential of the first pixel electrode 191a increases and the potential of the second pixel electrode 191b decreases.

Therefore, the voltage of the first pixel electrode 191a is greater than the first voltage and the voltage of the second pixel electrode 191b is less than the first voltage, such that the first pixel electrode 191a and the second pixel electrode 191b of one pixel PX are supplied with two voltages having the different polarities with respect to the first voltage, e.g., the common voltage Vcom. The storage capacitance of the first sharing capacitor Cs_a and the second sharing capacitor Cs_b may be controlled to control the magnitude of the voltage charged to the first pixel electrode 191a and the second pixel electrode 191b.

Generally, when one pixel is divided into the two pixel electrodes 191a and 191b, and the voltages having the different polarities are supplied through the different switching elements to charge the liquid crystal capacitor Clc with the voltage of the desired voltage magnitude, one pixel must be connected to one gate line and two different data lines. Thus, the first and second switching elements connected to the first and second pixel electrodes of each pixel are connected to the same gate line, however they are connected to different data lines such that the data voltages are applied through the different data lines.

In contrast, in one pixel of the liquid crystal display according to an exemplary embodiment of the present invention is connected to two gate lines forming as a pair, only one data line and only one voltage supplying line. Accordingly, a required number of data lines is decreased, such that the driver cost of the liquid crystal display is substantially reduced. In addition, even though the gate lines are formed in pairs, such that the number of gate lines is increased, the gate signals include only the gate-on/off signals, and the operation of the gate driver is simple as compared with that of the data driver, such that the manufacturing cost is not substantially increased. Also, although the voltage supplying lines are added, the voltage supplying lines are supplied with the first voltages having the same magnitude, such that a comparatively simple driver is required to supply the first voltage, and, accordingly the driving method is simple and the cost thereof is not substantially increased.

Figure 12:
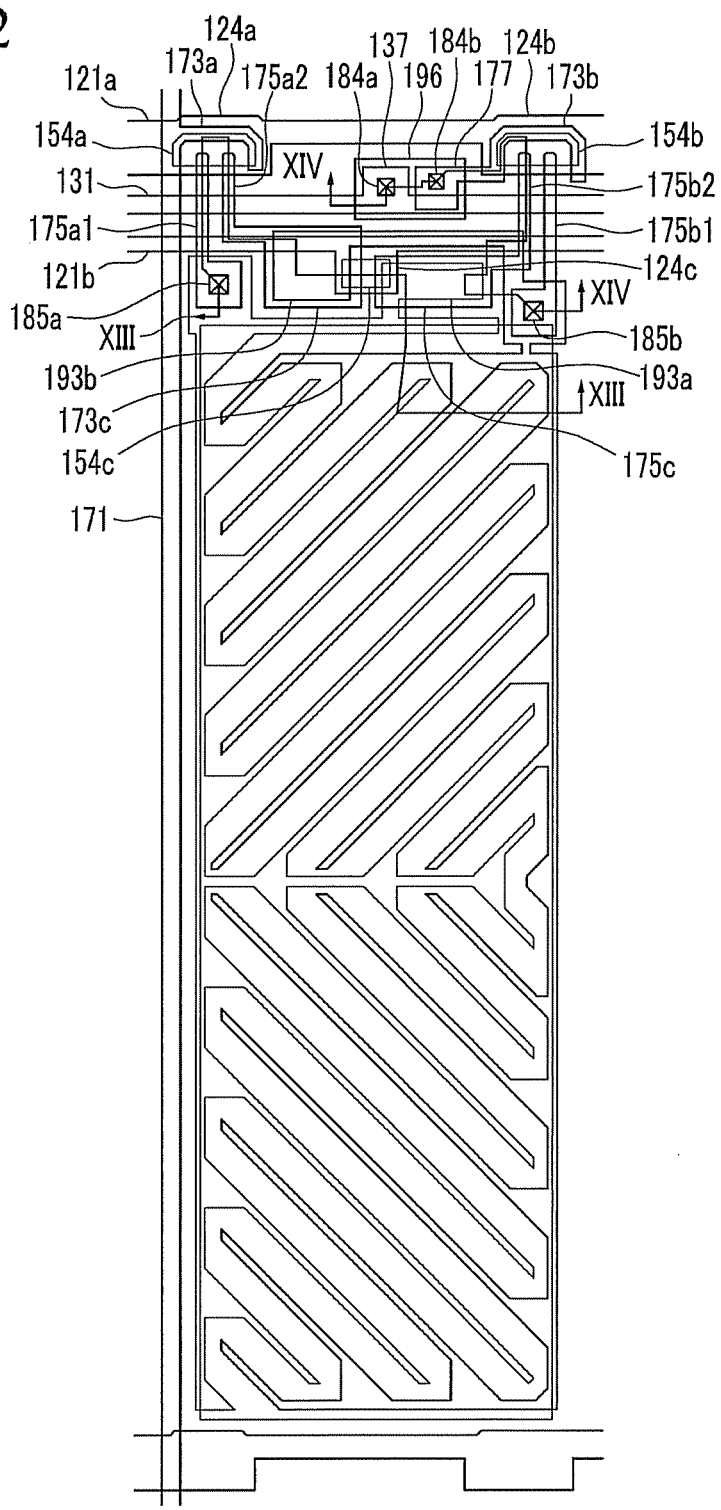
FIG. 12 is a plan view of still another exemplary embodiment of a liquid crystal panel assembly according to the present invention.

One example of an exemplary embodiment of the liquid crystal panel assembly will now be described in further with reference to FIGS. 12-14. FIG. 12 is a plan view of an exemplary embodiment of a liquid crystal panel assembly according to the present invention, FIG. 13 is a partial cross-sectional view taken along line XIII-XIII of FIG. 12, and FIG. 14 is a partial cross-sectional view taken along line XIV-XIV of FIG. 12.

Figure 13:
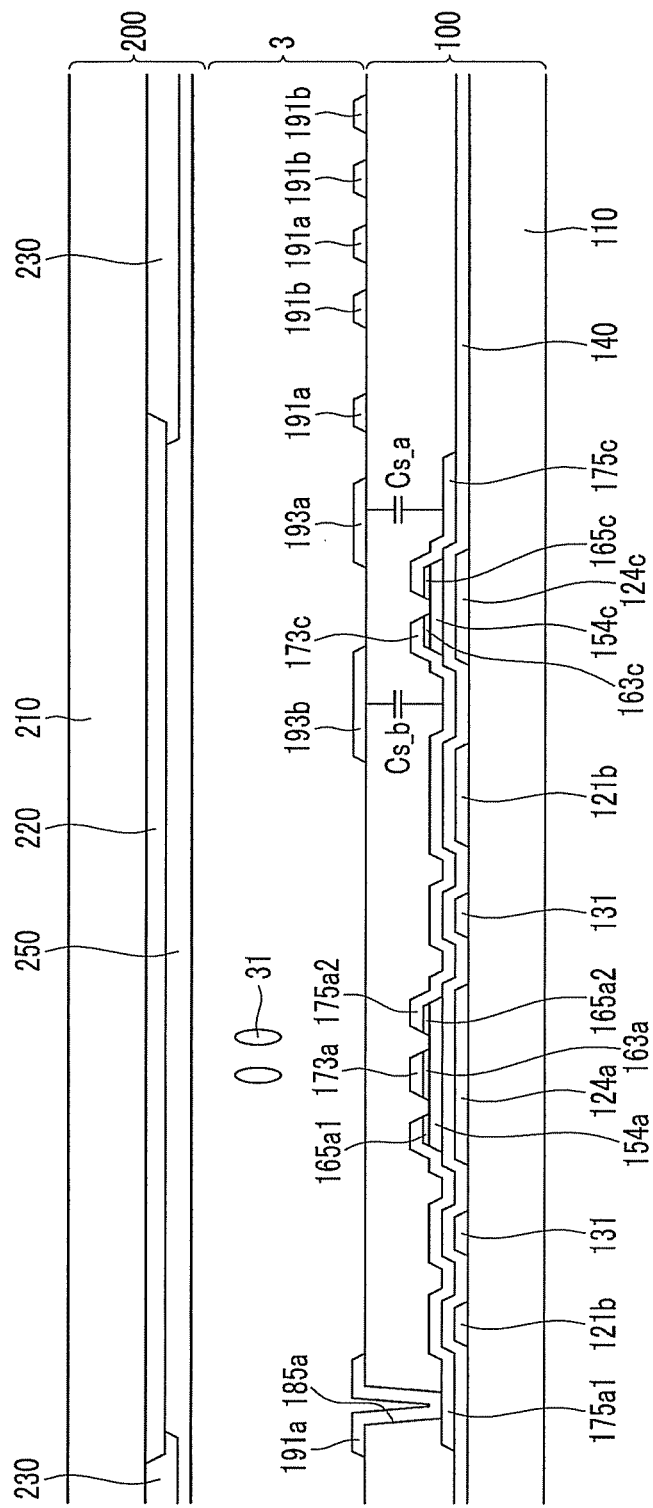
FIG. 13 is a partial cross-sectional view of taken along line XIII-XIII of FIG. 12.
Figure 14:
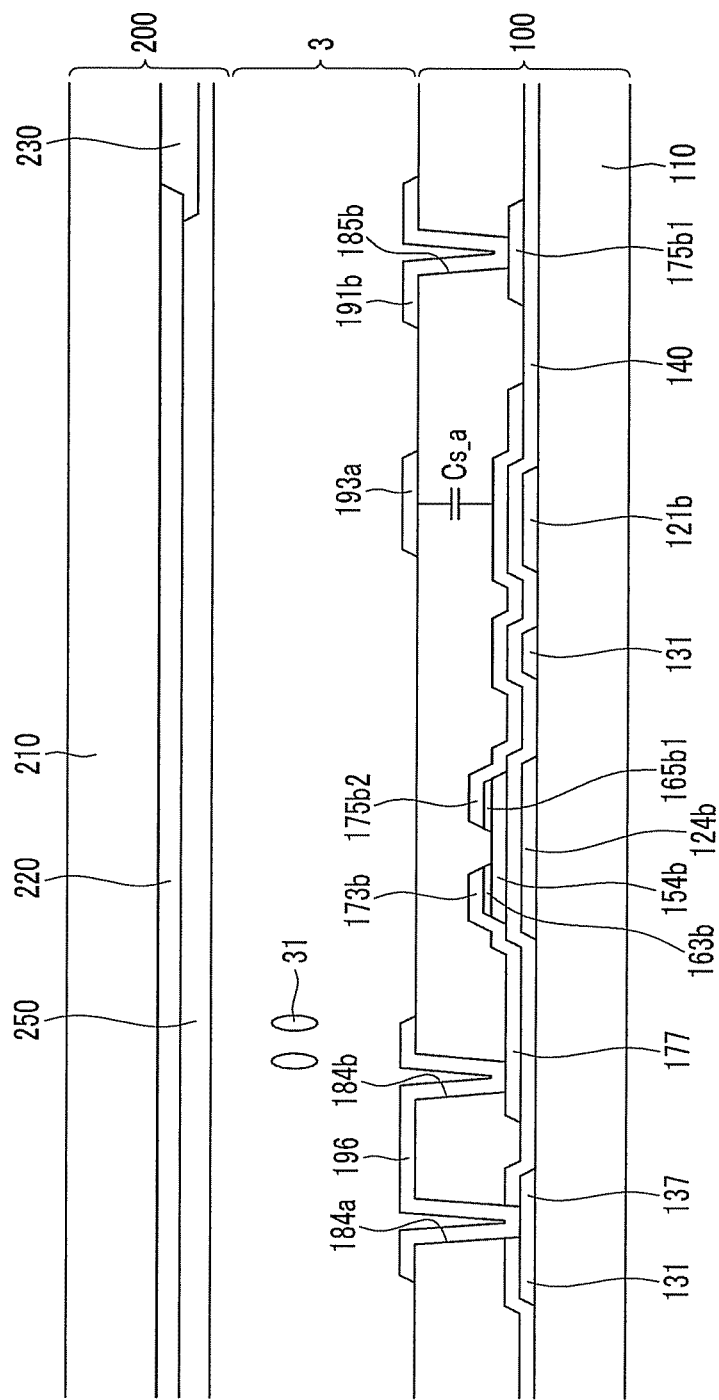
FIG. 14 is a partial cross-sectional view taken along the line XIV-XIV of FIG. 12.

Referring to FIGS. 12-14, a liquid crystal panel assembly according to an exemplary embodiment of the present invention includes a lower panel 100 and an upper panel 200 facing the lower panel 100, and a liquid crystal layer 3 interposed between the lower panel 100 and the upper panel 200.

As shown in FIGS. 12-14, the lower panel 100 includes pairs of gate lines 121a and 121b and a voltage supplying line 131 disposed on an insulation substrate 110. The voltage supplying line 131 receives the predetermined voltage, e.g., the first voltage. The voltage supplying line 131 includes an expansion 137.

A gate insulating layer 140 is disposed on the first gate lines 121a and the second gate lines 121b and the voltage supplying line 131, the first semiconductor island 154a, the second semiconductor island 154b, and the third semiconductor island 154c are disposed on the gate insulating layer 140, ohmic contacts 163a, 165a1, 165a2, 163b, 165b1, 163a and 165c are disposed on the first semiconductor island 154a, the second semiconductor island 154b, and the third semiconductor island 154c, and a data conductor including a data line 171, the first drain electrodes 175a1 and 175a2 forming a pair, the second source electrode 173b, and the second drain electrodes 175b1 and 175b2 forming a pair are disposed on the ohmic contacts 163a, 165a1, 165a2, 163b, 165b1, 163a, and 165c and the gate insulating layer 140. The first sub-drain electrode 175a1 of the first drain electrodes 175a1 and 175a2 forming the pair includes one end of a bar type and the other end having a wide area, and the second sub-drain electrode 175a2 is connected to the third source electrode 173c. The third sub-drain electrode 175b1 of the second drain electrodes 175b1 and 175b2 forming the pair includes one end of a bar type and the other end having a wide area, and the fourth sub-drain electrode 175b2 is connected to the third drain electrode 175c.

A passivation layer 180 is disposed on data conductors 171, 173b, 175a1, 175a2, 175b1, and 175b2 and the exposed first, second and third semiconductor islands 154a, 154b and 154c, respectively, and the passivation layer 180 includes a plurality of contact holes 184a, 185a, and 185b respectively exposing the end portion (not shown) of the data line 171, the expansion 177 of the second source electrode 173b, the wide end of the first sub-drain electrode 175a1, and the wide end of the third sub-drain electrode 175b1, and the passivation layer 180 and the gate insulating layer 140 have a contact hole 184b exposing the end (not shown) of the first gate lines 121a and the second gate lines 121b and the expansion 137 of the voltage supplying line 131.

The first pixel electrode 191a, the second pixel electrode 191b, and a connecting member 196 are disposed on the passivation layer 180. The first pixel electrode 191a includes the first capacitor electrode 193a, and the second pixel electrode 191b includes the second capacitor electrode 193b.

The first and second pixel electrodes 191a and 191b are generally vertically symmetrical with each other around a virtual transverse center line, and are divided into upper and lower regions.

The first pixel electrode 191a includes a lower projection, a left longitudinal stem, a transverse stem extending to the right from the center of the longitudinal stem, and a plurality of branches. The branch extends obliquely toward an upper right direction (as viewed in FIG. 12) and/or toward a lower right direction, and the branches may form an angle of about 45 degrees with the first gate line 121a, the second gate line 121b or the data line 171.

The second pixel electrode 191b includes the lower projection portion, a right longitudinal stem, upper and lower transverse stems and the plurality of branches. The upper and lower transverse stems extend horizontally to the left from a lower end and an upper end of the longitudinal stem, respectively. A branch extends obliquely in a lower left direction from the longitudinal stem portion or the upper horizontal stem. The other branch positioned below extends obliquely in an upper left direction from the longitudinal stem or the lower transverse stem. The branches of the second pixel electrode 191b may have the angle of about 45 degrees with the first gate lines 121a and the second gate lines 121b or the data line 171.

The branches of the first and second pixel electrodes 191a and 191b engage with each other with a predetermined gap and are alternately disposed, thereby forming a pectinated pattern.

It will be noted that the above-described shape of the first pixel electrode 191a and the second pixel electrode 191b of one pixel of the liquid crystal panel assembly according to an exemplary embodiment of the present invention is not limited thereto, and at least portions of the first and second pixel electrodes 191a and 191b may be formed within a same layer and may be alternately arranged.

The expansion 137 of the voltage supplying line 131 and the second source electrode 173b that are exposed through the contact holes 184a and 184b are physically and electrically connected to each other by the connecting member 196.

The first pixel electrode 191a is physically and electrically connected to the first sub-drain electrode 175a1 through the contact hole 185a to thereby receive the data voltage from the first sub-drain electrode 175a1, and the second pixel electrode 191b is physically and electrically connected to the third sub-drain electrode 175b1 through the contact hole 185b to thereby receive the first voltage from the third sub-drain electrode 175b1. The first capacitor electrode 193a of the first pixel electrode 191a and the fourth sub-drain electrode 175b2 overlap each other with the passivation layer 180 interposed therebetween to form the first sharing capacitor Cs_a, and the second capacitor electrode 193b of the second pixel electrode 191b and the second sub-drain electrode 175a2 overlap each other with the passivation layer 180 interposed therebetween to form the second sharing capacitor Cs_b.

As shown in FIGS. 12-14, the upper panel 200 includes a light blocking member 220 disposed on an insulation substrate 210, and includes color filters 230 disposed thereon. An overcoat 250 is disposed on the color filters 230 and the light blocking member 220.

Alignment layers (not shown) are disposed on inner surfaces of lower panel 100 and the upper panel 200, and the alignment layers may be vertical alignment layers.

Liquid crystal molecules 31 of the liquid crystal layer 3 may have positive dielectric anisotropy, and may be aligned such that the directors thereof are aligned substantially perpendicular to surfaces of the lower panel 100 and the upper panel 200 when an electric field is not applied to the liquid crystal layer 3.

Thus, as described herein, one pixel of a liquid crystal display according to an exemplary embodiment of the present invention is connected to two gate lines (formed as a pair), only one data line and only one voltage supplying line. Accordingly, a required number of data lines is reduced, and the cost of the driver of the liquid crystal display is therefore substantially reduced. In addition, although the gate lines are formed in pairs, such that the number of gate lines is increased, the gate signals include only the gate-on/off signals, such that operation of the gate driver is simple as compared with the data driver, such that the manufacturing cost is not substantially increased. Also, even though the voltage supplying lines are added, the voltage supplying lines are supplied only with the first voltages having substantially the same magnitude, such that a simple driver is used to supply the first voltage, and, accordingly, the driving method is simple and the added cost is not significantly increased.

The present invention should not be construed as being limited to the exemplary embodiments set forth herein. Rather, these exemplary embodiments are provided so that this disclosure will be thorough and complete and will fully convey the concept of the present invention to those skilled in the art.

Additionally, while the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display comprising:
a first substrate;
a second substrate disposed opposite the first substrate;
a liquid crystal layer interposed between the first substrate and the second substrate and including liquid crystal molecules;
a first gate line disposed on the first substrate;
a second gate line disposed on the first substrate;
a data line disposed on the first substrate;
a voltage supplying line disposed on the first substrate; and
a pixel comprising:
a first pixel electrode and a second pixel electrode;
a first switching element including a control terminal connected to the first gate line, an input terminal connected to the data line, and a output terminal connected to the first pixel electrode;
a second switching element including a control terminal connected to the first gate line, an input terminal connected to the voltage supplying line, and a output terminal connected to the second pixel electrode;
a third switching element including a control terminal connected to the second gate line, an input terminal connected to the output terminal of the first switching element, a output terminal connected to the output terminal of the second switching element;
a first sharing capacitor including the first pixel electrode and an output terminal of the second switching element as terminals thereof; and
a second sharing capacitor including the second pixel electrode and an output terminal of the first switching element as terminals thereof;
wherein the voltage supplying line is supplied with a first voltage having a substantially uniform magnitude,
wherein the liquid crystal molecules are arranged substantially parallel to surfaces of the first substrate and the second substrate when an electric field is not applied to the liquid crystal layer, and
wherein, when the first gate line is supplied with a gate-on signal,
the first sharing capacitor is charged with a first charge by the first voltage,
the second sharing capacitor is charged with a second charge by a first data voltage through the data line, and
an amount of the second charge is greater than an amount of the first charge.

2. The liquid crystal display of claim 1, wherein
the input terminal of the third switching element is connected to the output terminal of the first switching element of the terminals of the second sharing capacitor, and
an output terminal of the third switching element is connected to the output terminal of the second switching element of the terminals of the first sharing capacitor.

3. The liquid crystal display of claim 2, wherein, when the first gate line is supplied with the gate-on signal,
the first pixel electrode is supplied with the first data voltage through the data line,
the second pixel electrode is applied with the first voltage through the voltage supplying line, and an absolute value of the first data voltage is greater than an absolute value of the first voltage.

4. The liquid crystal display of claim 1, wherein, when the second gate line is supplied with the gate-on signal,
the second charge charged to the second sharing capacitor is transferred to the first sharing capacitor by the third switching element.

5. The liquid crystal display of claim 4, wherein, when the second gate line is supplied with the gate-on signal,
the first pixel electrode and the second pixel electrode are electrically floated.

6. The liquid crystal display of claim 5, wherein
the second charge charged to the second sharing capacitor is transferred to the first sharing capacitor by the third switching element such that
the voltage of the first pixel electrode increases, and
the voltage of the pixel electrode decreases.

7. The liquid crystal display of claim 6, wherein
the voltage of the first pixel electrode is greater than the first voltage, and
the voltage of the second pixel electrode is less than the first voltage.

8. The liquid crystal display of claim 7, further comprising a common electrode disposed on the second substrate.

9. The liquid crystal display of claim 8, wherein the liquid crystal molecules have negative dielectric anisotropy.

10. The liquid crystal display of claim 9, wherein
the first pixel electrode and the second pixel electrode include branch electrodes, and
the branch electrodes of the first pixel electrode and the branch electrodes of the second pixel electrode are alternately disposed on the first substrate.

11. The liquid crystal display of claim 1, wherein the liquid crystal molecules have negative dielectric anisotropy.

12. The liquid crystal display of claim 11, wherein
the first pixel electrode and the second pixel electrode include branch electrodes, and
the branch electrodes of the first pixel electrode and the branch electrodes of the second pixel electrode are alternately disposed on the first substrate.

13. The liquid crystal display of claim 1, wherein
the first pixel electrode and the second pixel electrode include branch electrodes, and
the branch electrodes of the first pixel electrode and the branch electrodes of the second pixel electrode are alternately disposed on the first substrate.

14. The liquid crystal display of claim 7, wherein the liquid crystal molecules have negative dielectric anisotropy.

15. The liquid crystal display of claim 14, wherein
the first pixel electrode and the second pixel electrode include branch electrodes, and
the branch electrodes of the first pixel electrode and the branch electrodes of the second pixel electrode are alternately disposed on the first substrate.

16. The liquid crystal display of claim 7, wherein
the first pixel electrode and the second pixel electrode include branch electrodes, and
the branch electrodes of the first pixel electrode and the branch electrodes of the second pixel electrode are alternately disposed on the first substrate.

17. The liquid crystal display of claim 7, wherein
the liquid crystal molecules have positive dielectric anisotropy.

18. The liquid crystal display of claim 17, wherein
the first pixel electrode and the second pixel electrode include branch electrodes, and
the branch electrodes of the first pixel electrode and the branch electrodes of the second pixel electrode are alternately disposed on the first substrate.

19. The liquid crystal display of claim 1, wherein, when the second gate line is supplied with the gate-on signal,
the first pixel electrode and the second pixel electrode are electrically floated.

20. The liquid crystal display of claim 19, wherein
the second charge charged to the second sharing capacitor is transferred to the first sharing capacitor by the third switching element such that a voltage of the first pixel electrode increases and a voltage of the pixel electrode decreases.

21. The liquid crystal display of claim 20, wherein
the voltage of the first pixel electrode is greater than the first voltage, and
the voltage of the second pixel electrode is less than the first voltage.

22. The liquid crystal display of claim 21, further comprising a common electrode disposed on the second substrate.

23. The liquid crystal display of claim 22, wherein
the liquid crystal molecules have negative dielectric anisotropy.

24. The liquid crystal display of claim 23, wherein
the first pixel electrode and the second pixel electrode include branch electrodes, and
the branch electrodes of the first pixel electrode and the branch electrodes of the second pixel electrode are alternately disposed on the first substrate.

25. The liquid crystal display of claim 22, wherein the liquid crystal molecules have negative dielectric anisotropy.

26. The liquid crystal display of claim 25, wherein
the first pixel electrode and the second pixel electrode include branch electrodes, and
the branch electrodes of the first pixel electrode and the branch electrodes of the second pixel electrode are alternately disposed on the first substrate.

27. The liquid crystal display of claim 22, wherein
the first pixel electrode and the second pixel electrode include branch electrodes, and
the branch electrodes of the first pixel electrode and the branch electrodes of the second pixel electrode are alternately disposed on the first substrate.

28. The liquid crystal display of claim 21, wherein
the liquid crystal molecules have negative dielectric anisotropy.

29. The liquid crystal display of claim 28, wherein
the first pixel electrode and the second pixel electrode include branch electrodes, and
the branch electrodes of the first pixel electrode and the branch electrodes of the second pixel electrode are alternately disposed on the first substrate.

30. The liquid crystal display of claim 21, wherein the liquid crystal molecules have negative dielectric anisotropy.

31. The liquid crystal display of claim 30, wherein
the first pixel electrode and the second pixel electrode include branch electrodes, and
the branch electrodes of the first pixel electrode and the branch electrodes of the second pixel electrode are alternately disposed on the first substrate.

32. The liquid crystal display of claim 21, wherein
the first pixel electrode and the second pixel electrode include branch electrodes, and
the branch electrodes of the first pixel electrode and the branch electrodes of the second pixel electrode are alternately disposed on the first substrate.

33. The liquid crystal display of claim 21, wherein the liquid crystal molecules have positive dielectric anisotropy.

34. The liquid crystal display of claim 33, wherein
the first pixel electrode and the second pixel electrode include branch electrodes, and
the branch electrodes of the first pixel electrode and the branch electrodes of the second pixel electrode are alternately disposed on the first substrate.

35. The liquid crystal display of claim 1, wherein, when the second gate line is supplied with the gate-on signal,
the second charge charged to the second sharing capacitor is transferred to the first sharing capacitor by the third switching element.

36. The liquid crystal display of claim 35, wherein, when the second gate line is applied with the gate-on signal, the first pixel electrode and the second pixel electrode are electrically floated.

37. The liquid crystal display of claim 36, wherein
the second charge charged to the second sharing capacitor is transferred to the first sharing capacitor by the third switching element such that a voltage of the first pixel electrode increases, and a voltage of the second pixel electrode decreases.

38. The liquid crystal display of claim 37, wherein
the voltage of the first pixel electrode is greater than the first voltage, and
the voltage of the second pixel electrode is less than the first voltage.

39. The liquid crystal display of claim 1, further comprising a common electrode disposed on the second substrate.

40. The liquid crystal display of claim 39, wherein the liquid crystal molecules have negative dielectric anisotropy.

41. The liquid crystal display of claim 40, wherein
the first pixel electrode and the second pixel electrode include branch electrodes, and
the branch electrodes of the first pixel electrode and the branch electrodes of the second pixel electrode are alternately disposed on the first substrate.

42. The liquid crystal display of claim 39, wherein the liquid crystal molecules have negative dielectric anisotropy.

43. The liquid crystal display of claim 42, wherein
the first pixel electrode and the second pixel electrode include branch electrodes, and
the branch electrodes of the first pixel electrode and the branch electrodes of the second pixel electrode are alternately disposed on the first substrate.

44. The liquid crystal display of claim 39, wherein
the first pixel electrode and the second pixel electrode include branch electrodes, and
the branch electrodes of the first pixel electrode and the branch electrodes of the second pixel electrode are alternately disposed on the first substrate.

* * * * *